(12) United States Patent
Price

(10) Patent No.: US 6,916,211 B2
(45) Date of Patent: Jul. 12, 2005

(54) ELECTRICAL CIRCUIT BREADBOARD

(76) Inventor: Eric Charles Price, 390 Chamberlain Street, Pembroke, Ontario (CA), K8A 2N4

(*) Notice: Subject to any disclaimer, the term of this patent is extended or adjusted under 35 U.S.C. 154(b) by 186 days.

(21) Appl. No.: 10/369,131

(22) Filed: Feb. 20, 2003

(65) Prior Publication Data

US 2004/0163837 A1 Aug. 26, 2004

(51) Int. Cl.[7] ............................................... H01R 13/04
(52) U.S. Cl. ..................................................... 439/697
(58) Field of Search ........................... 439/697, 49, 46, 439/507, 55, 68; 434/224, 219, 338–341, 345, 343

(56) References Cited

U.S. PATENT DOCUMENTS 3,299,393 A * 1/1967 Kelley et al. .................. 439/49
3,447,039 A * 5/1969 Branagan ..................... 361/774
3,989,338 A * 11/1976 Gosser ......................... 439/43
5,611,691 A * 3/1997 Poulain ....................... 434/224

* cited by examiner

Primary Examiner—J. F. Duverne
(74) Attorney, Agent, or Firm—David J. French

(57) ABSTRACT

An electronic circuit construction system uses plastic perforated connectors with mounting posts that are inserted directly onto a pictorial diagram of an electronic circuit. An underlying foam base anchors the posts in place. Components and hook-up wire depicted on the diagram are then installed in place on the connectors to complete the electrical circuit.

14 Claims, 6 Drawing Sheets

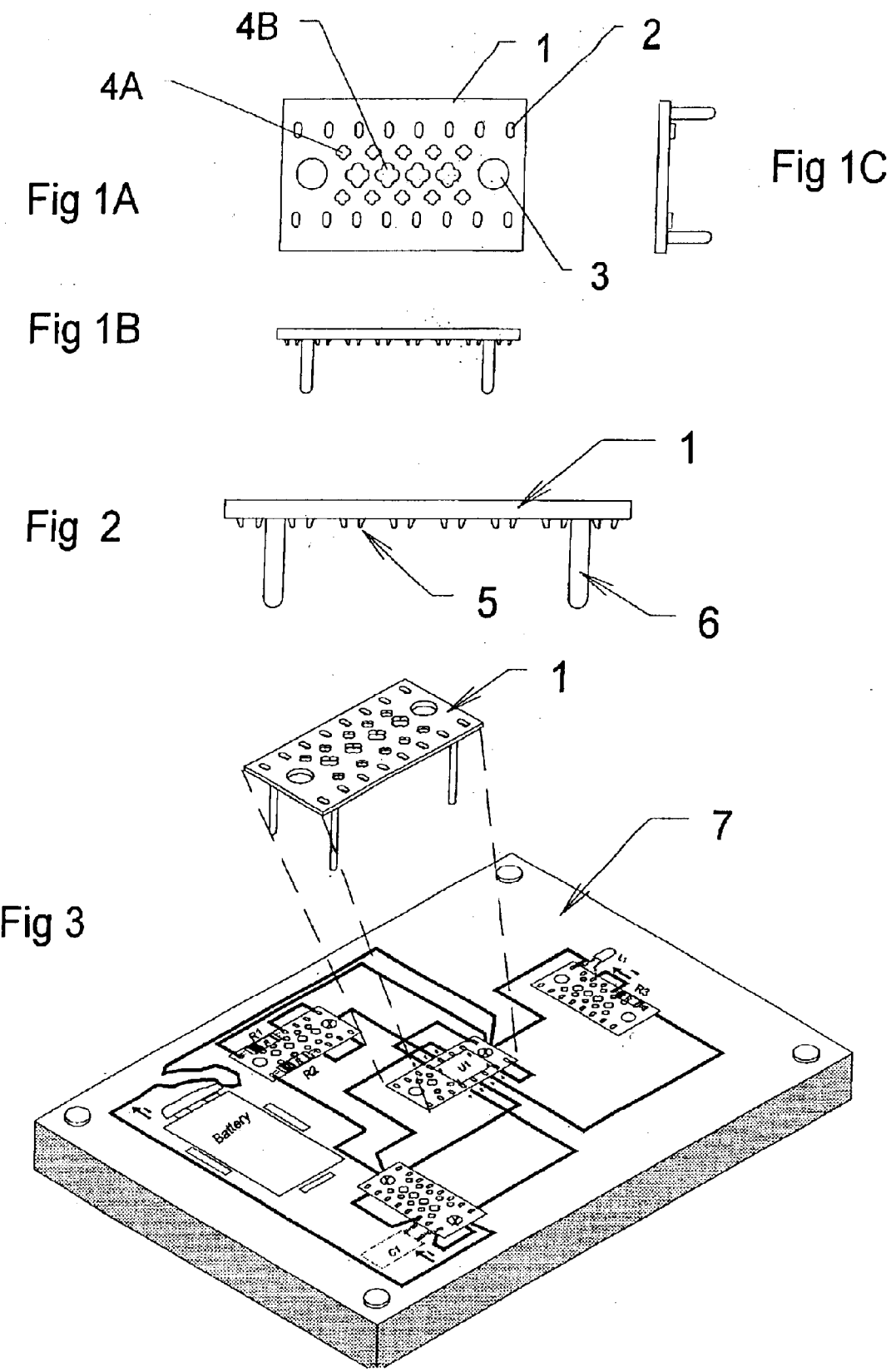

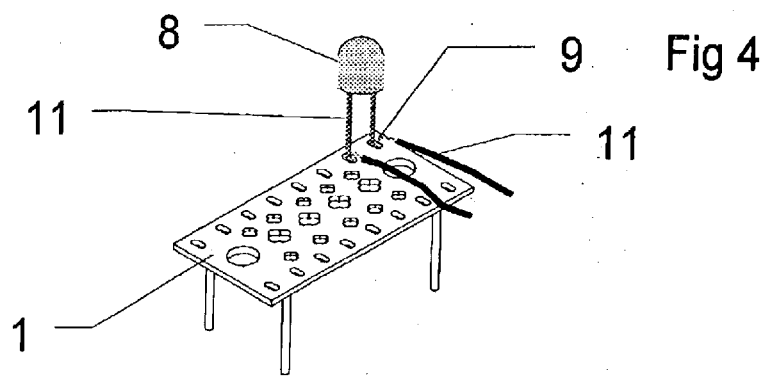
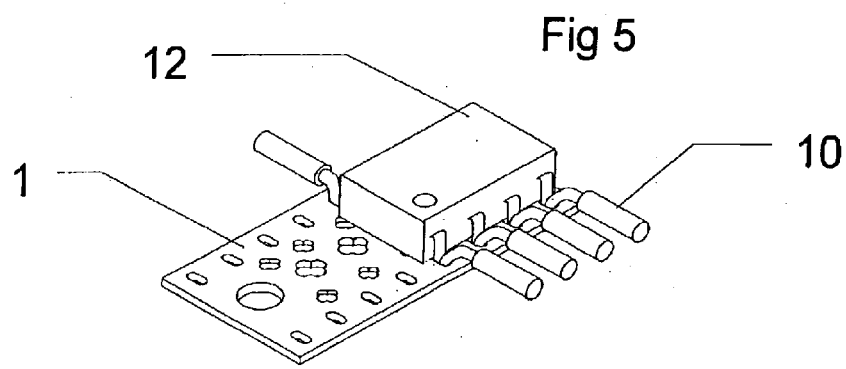
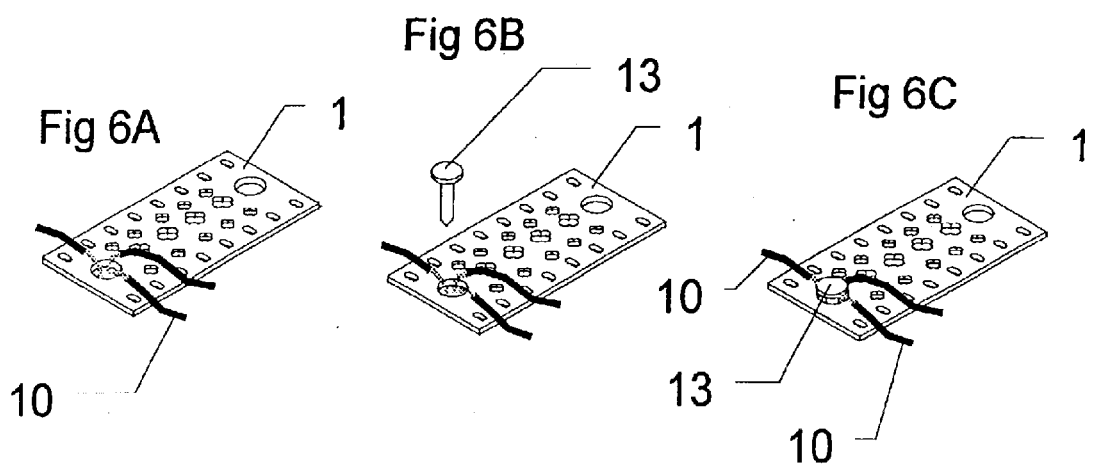

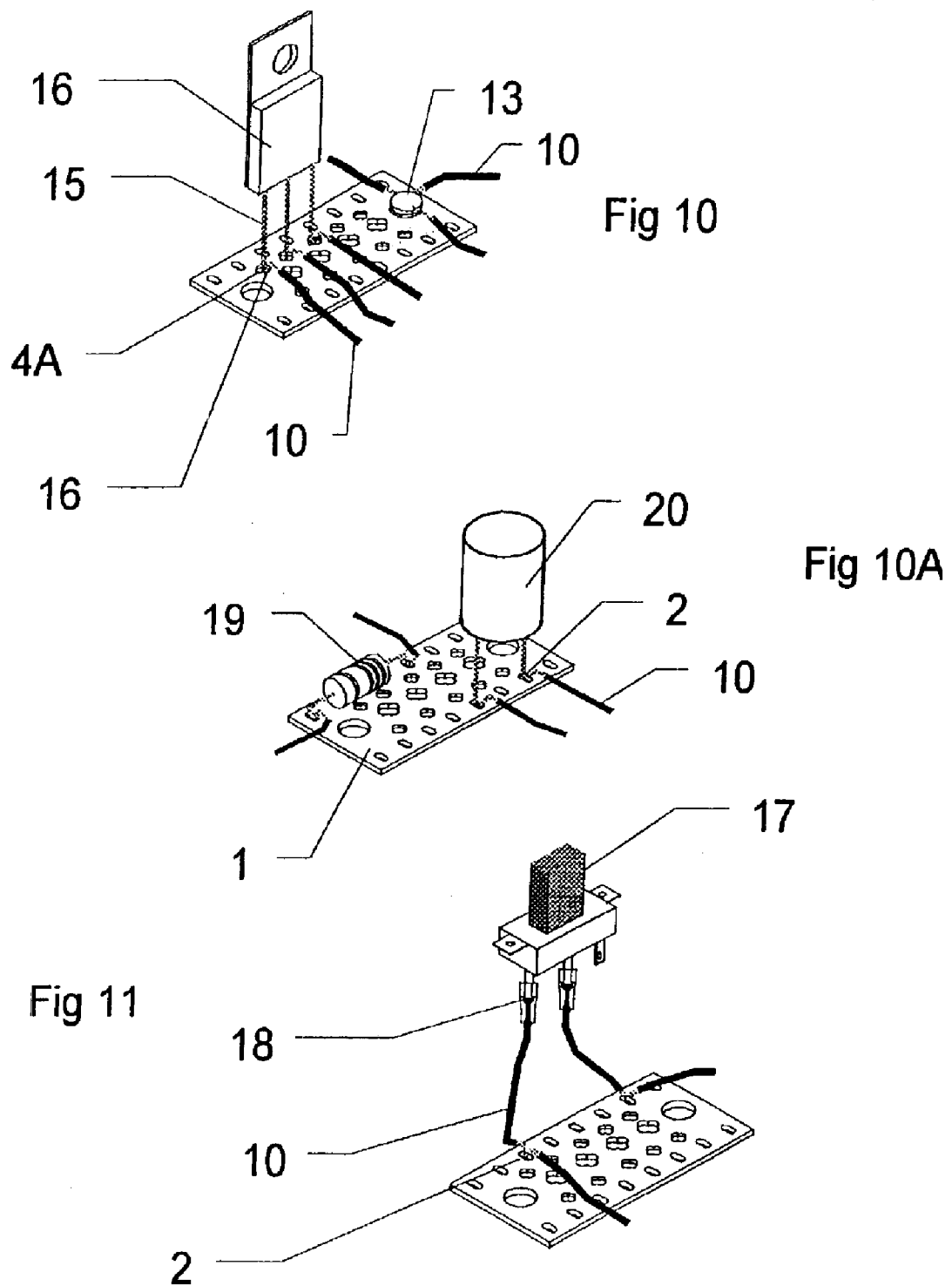

Fig 12
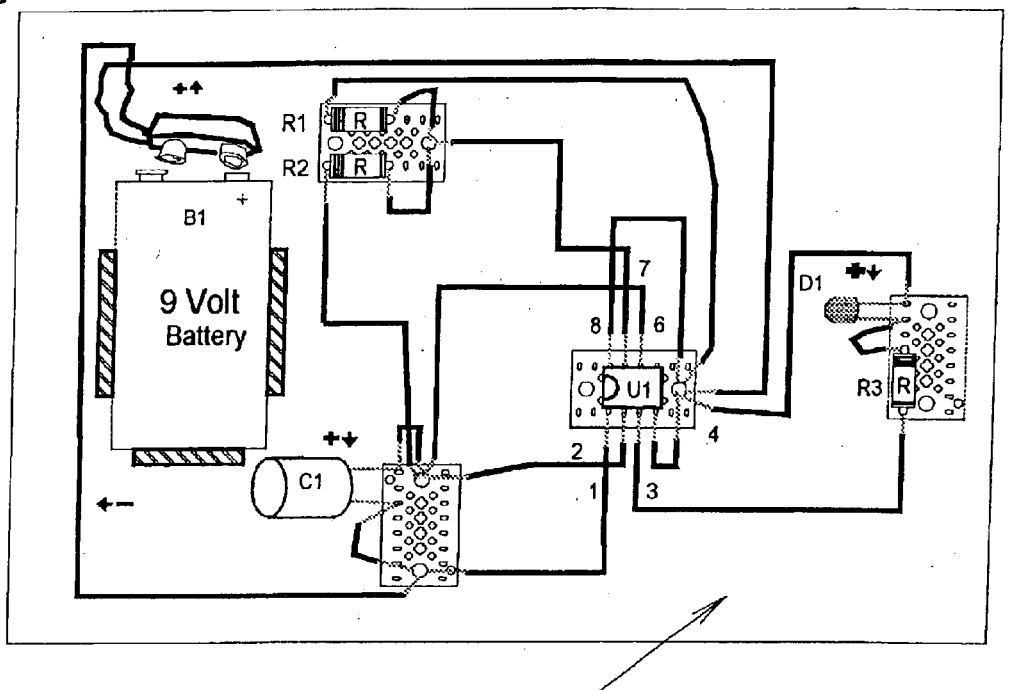
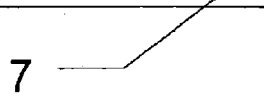
Fig 13
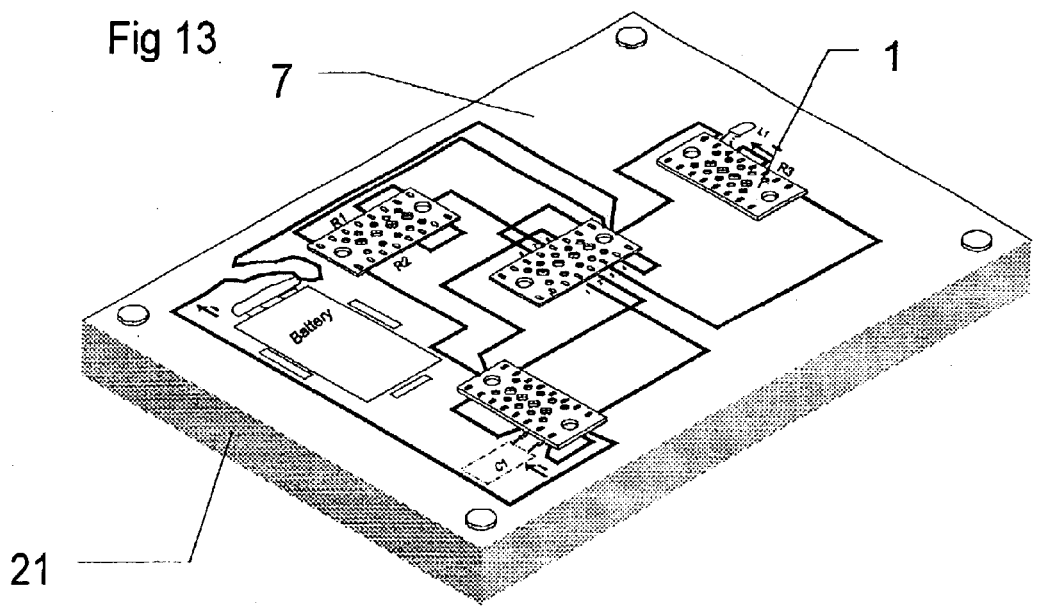

ELECTRICAL CIRCUIT BREADBOARD

FIELD OF THE INVENTION

This invention relates to the field of electronics. In particular, it relates to a system and components used to construct electronic circuits. More particularly the invention is suited for instructing students at the beginner level of electrical circuit construction.

BACKGROUND TO THE INVENTION

In the teaching of electronics to students, it is essential that the students be exposed to the actual building of circuits. This requires students to read and interpret schematic diagrams, and then connect components in the manner laid out in such diagrams.

Students, particularly at the high school level, become easily frustrated when they are unable to properly follow the schematic diagram. They are especially frustrated when a circuit that they have worked on for some time does not operate properly.

A need exists for an aid to assist students in properly laying out circuit components in a way which will minimize errors and which will enable students to visualize the tangible circuit that corresponds with a schematic circuit diagram.

This invention addresses such a need.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification

SUMMARY OF THE INVENTION

According to one aspect, the invention relies upon the use of two elements. The first element is a connector for receiving lead wires from electrical components. The second element is a wiring block diagram that is especially laid-out to receive the connectors in order to aid students to construct electronic circuits of varying complexity.

The connector element has a number of topside apertures that provide a simplified means to connect together electronic components such as resistors, capacitors, diodes, transistors, integrated circuits and other electronic components for the purpose of constructing electronic. The connector element apertures are dimensioned and constructed to provide both a mechanical support for and electrical continuity between electrical component leads and hook-up wire. This is achieved by simply pushing component leads and hook-up wire into the apertures or slots provided on the connector without the need for soldering.

The connectors also embody a means of providing mechanical connection and electrical continuity between pieces of hook-up wire at node points that can accommodate a combination of either two, three or four hook-up wires as may be optionally required by the circuit. A tight connection may be assured by insertion of a jamming means in the form of a nail or pin into the aperture occupied by the wire ends.

To enhance the retention of wire and lead ends, the apertures preferably are provided around their lower edges with grasping means in the form of resilient fingers or nibs that bear against the wire ends.

In use, the connectors are placed on specific locations on the wiring diagram over pictorial depictions of the connectors so that the circuit layout wiring diagram is readily visible at all times for the student. To fix the connectors in place, such connectors are preferably provided with protrusions on their underside that penetrate a base positioned beneath the wiring diagram and stabilize the connectors in place on the wiring diagram.

The circuit layout provided by the wiring diagram is clearly visible at all times by the student including depictions of the components. The actual patterns and paths for the wires are shown on the diagram, making it highly unlikely that the student will make a connection error. If this occurs, the invention assists the teacher in observing and locating any student errors.

The foregoing summarizes the principal features of the invention and some of its optional aspects. The invention may be further understood by the description of the preferred embodiments, in conjunction with the drawings, which now follow.

BRIEF DESCRIPTION OF THE DRAWINGS

FIGS. 1A, 1B and 1C are top, front and side views, respectively of a connector according to an embodiment of the invention;

FIG. 2 is a close-up side view of the connector of FIG. 1B showing underside grasping nibs;

FIG. 3 is an isometric view of the connector of FIG. 2, aligned over a circuit diagram for insertion thereon;

FIG. 4 is a depiction of an LED installed on a connector;

FIG. 5 is a depiction of a DIP integrated circuit chip inserted into a connector as in FIG. 2;

FIGS. 6A, 6B and 6C are pictorial depictions of the assembly of three wire lead ends into an aperture on the connector, together with an engagement pin;

FIG. 10 depicts the engagement of the leads of a transistor into a multi-sized aperture for engagement with smaller wires;

FIG. 10A depicts a resistor and capacitor mounted on the same connector;

FIG. 11 depicts a switch connected by extension wires to a connector;

FIG. 12 is an electrical circuit block diagram according to an embodiment of the invention;

FIG. 13 is the diagram of FIG. 12 with a connector mounted thereon over a foam base to provide an eventual circuit;

DESCRIPTION OF THE PREFERRED EMBODIMENT

Figure 7A:
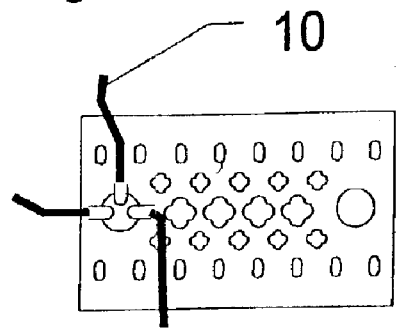
FIGS. 7A and 7B are progressive top views of the insertion of the engagement pin of FIGS. 6A, 6B and 6C.

The connectors 1 are preferably made from injection molded plastic. FIGS. 1A, 1B and 1C show a connector 1 of the invention from top, front side and right side views. Two enlarged circular node holes 3 provide a three or four lead wire connection point. Smaller elongate or slotted holes 2 provide up to sixteen component connection slots for pairs of component leads. Smaller and larger cross-like component connection holes 4A and 4B accommodate components and/or wiring with varying lead sizes.

The elongate paired-lead connecting slots 2 are preferably spaced at 0.1-inch intervals to accommodate standard integrated circuit components commonly referred to as an IC or Chip. The overall dimensions of the main plate of the connector are preferably 0.8 by 0.5 inches with the plate having a thickness of about ⅛ inches. A connector preferably comprises two rows of eight lead pair slots in the form of slotted holes 2; the two rows are substantially separated by 0.3 inches.

In FIG. 2 small holding nibs 5 extend beneath the slots 2. These nibs 5 are preferably resilient and may be inwardly inclined to grasp and anchor component leads. Four holding pins 6 protrude downwardly from the main surface of the connector 1, when the connector is in an upright position. The holding pins 6 are for penetrating the circuit diagram 7 at the locations that pictorially depict the presence of connectors 1.

The connector of the invention is shown enlarged in FIG. 3 in an isometric view poised above a portion of the circuit diagram 7 where it is to be installed.

FIG. 4 shows the connector 1 depicted receiving a Light Emitting Diode (L.E.D.) 8 with its lead 11 being inserted into two elongate paired-lead holes 2. Additionally the ends 9 of two stripped connecting wires 10 are inserted in the same paired-lead holes 2 to make electrical connection with the leads 11 on the LED 8. So installed, the LED 8 and connecting wire ends 9 are mechanically fixed in place as well as being electrically connected.

In FIG. 5 an 8 DIP Integrated Circuit 12 is shown inserted into eight paired-lead holes 2 with the ends of five lengths of hook-up connecting wires 10 also inserted into five of the eight paired-lead holes 2.

FIGS. 6A, 6B and 6C show progressively the circular aperture 3 of the connector 1 of the invention being used as a three-wire node point in a circuit for the ends of three pieces of hook-up connecting wire 10. To stabilize the wire ends 9, a nail or pin 13 of electrically conductive material is inserted into the circular opening to jam the wire ends 9 in place.

The inserted pin 13 is dimensioned to make physical contact with all of the wire ends 9 and thus provides electrical conduction between the hook-up wires 10.

Figure 7B:
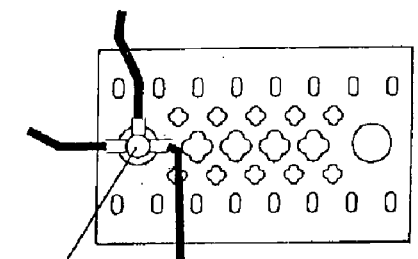

FIGS. 7A and 7B show progressively top views of the three hook-up to wires 10 of FIGS. 6A, 61 and 6C inserted in place followed by the conductive pin 13.

Figure 8:
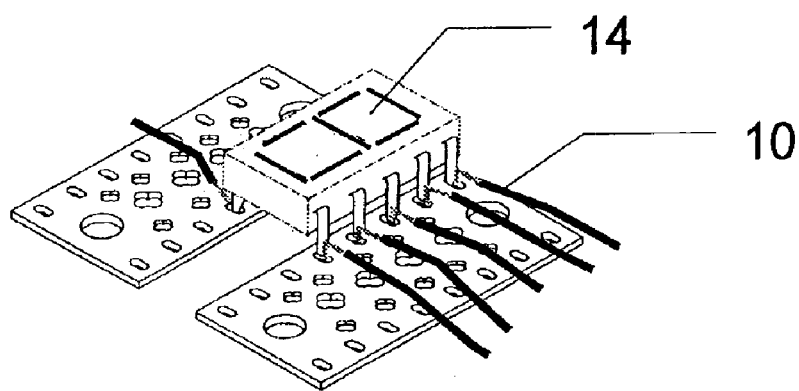
FIG. 8 depicts a single IC inserted into and straddling the space between two connectors.

FIG. 8 shows that the connector 1 of the invention can accommodate Integrated Circuits 14 having a greater width or length than 0.300 inch. This is effected by placing two connectors on the wiring diagram 7 at is appropriately spaced positions adjacent to each other so that the Integrated Circuit 14 extends between the two connectors 1.

Figure 9:
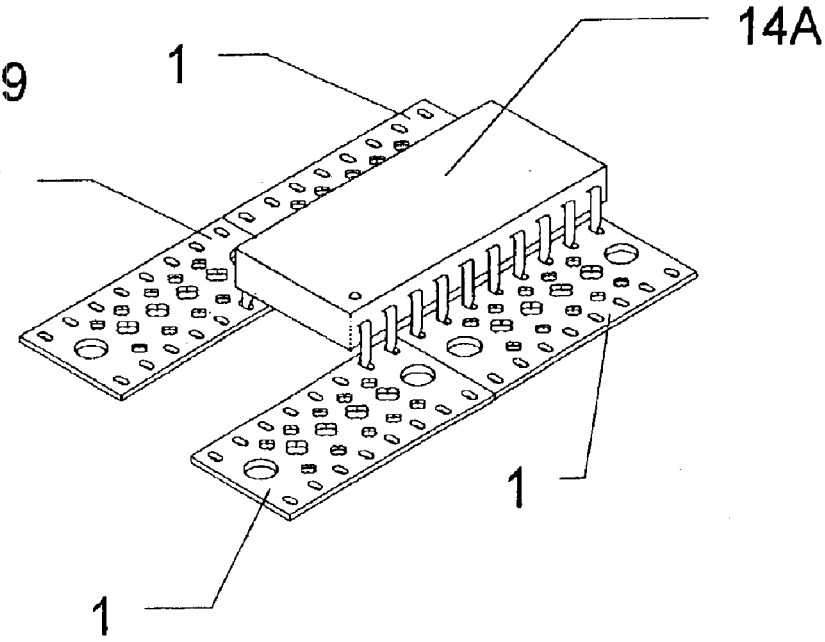
FIG. 9 depicts an extra long IC engaged with four connectors.

In FIG. 9 an extra long IC, 14A, is fitted into two pairs of connectors 1.

In FIG. 10 larger sized leads 15 of a transistor 16 are fitted into the smaller 4A of the two cross-format apertures 4A, 4B that are designed to accommodate wires 10 of differing sizes. The transistor leads 15 fit in the larger core opening of the cross-formation, and the smaller hook-up leads 10 fit into one of the four smaller peripheral slots 16. While four peripheral slots 16 are shown, other numbers of slots 16 are optionally employed.

In FIG. 10A, a fixed resistor 19 and capacitor 20 are shown as being separately connected to lead wires 10 on the same base of a single connector 1.

As shown in FIG. 11 components whose leads are larger than what the connector openings are accommodated by jumper leads that, for example, terminate in standard butt connectors. Any component with leads that the connector 1 does not directly accommodate can be used by the attachment of secondary connectors such as female lugs 18 and or butt connectors to the part's leads. Appropriate sized hook-up wire 10 is then attached between the part and the connector. FIG. 11 shows a common switch 17 that is thus accommodated by this method.

The second aspect of the invention is the special wiring diagram 7. The wiring diagrams of the invention provide the physical circuit layout and are created from schematic diagrams. These circuit layout-wiring diagrams provide the information as to where each electronic component is to be inserted in the circuit. Serving as at "map" on a 1 to 1 scale that acts as a template for assembling circuit elements, the wiring diagram also provides information as to a component's polarity, a component's identification letter label, a pictorial depiction of the part, IC pin identification, resistor value. Optionally, the wiring diagram indicates where electrical nodes occur within the circuit. The connectors 1 are dimensioned to be fitted over depictions of the connector at places where connections are to be effected.

FIG. 12 shows a simple example of an electrical circuit block diagram according to the invention which incorporates these features.

A feature of the connectors 1 of the invention is that they are equipped with downwardly protruding holding pins 6 extending from the base plate of the connector 1, when the connector is in an upright position. The printed circuit diagrams 7 are placed on a perforatable substrate, such as a board of dense polyurethane or polystyrene foam 21, such substrate being of sufficient thickness and density to receive the holding pins 6 and hold the connectors 1 in place. The connectors 1 are inserted directly through the paper that contains the wiring diagram 7, enabling the connectors 1 to be held at anchored positions on the substrate 21 that supports the wiring diagram 7 and all of the components of the electronic circuit on its upper surface.

Optionally, an additional more rigid backing e.g. a plywood board (not shown) can be applied as by gluing to the bottom side of the substrate base 21 if the circuit is to be used in a permanent installation. Further, if a permanent circuit were desired, then the connectors 1 could be glued to the base 21 with nonconductive glue. As well conductive glue can be applied at each electrical contact point in the circuit. With these features in place a circuit can be provided that withstands considerable shock and provides vibration dampening to the electrical components.

The circuit diagrams of the invention served admirably in providing students with a system for learning electronics that is simple to follow and easy to comprehend, providing a consistent positive outcome to motivate the student to create more complex circuits.

The following procedure demonstrates the electronic circuit construction process using an EASYE™ block diagram and EASYE™ connectors.

Step One:
  The EASYE™ circuit diagram 7 is printed on paper in colour or black and white. This diagram 7 is then cut out and tacked by adhesive onto a foam base 21 that is cut to the size required by the circuit. FIG. 12 shows an EASYE™ diagram 7 that has been cut out from a sheet of paper to be tacked to a foam base 21

Step Two:
  The EASYE™ connectors 1 are then inserted into the EASYE™ diagram 7 and through, into the foam base 21 as shown in FIG. 13.

Figure 14:
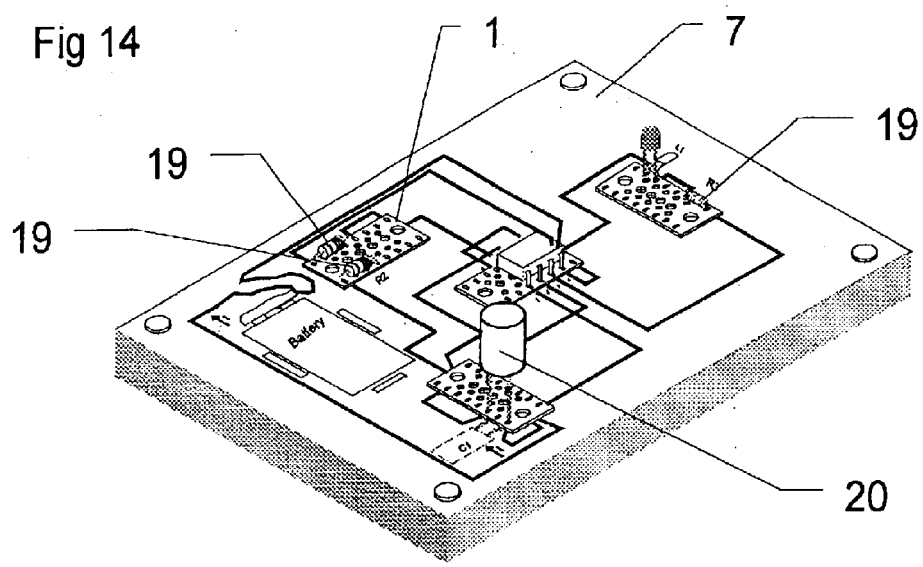
FIG. 14 is the partial circuit of FIG. 13 with components mounted on the connectors.

Step Three:
  Next, the electronic components as indicated by the information provided on the EASYE™ circuit diagram 7 are inserted into connectors 1 at their assigned places, according to the images on the circuit diagram 7, as shown in FIG. 14.

Figure 15:
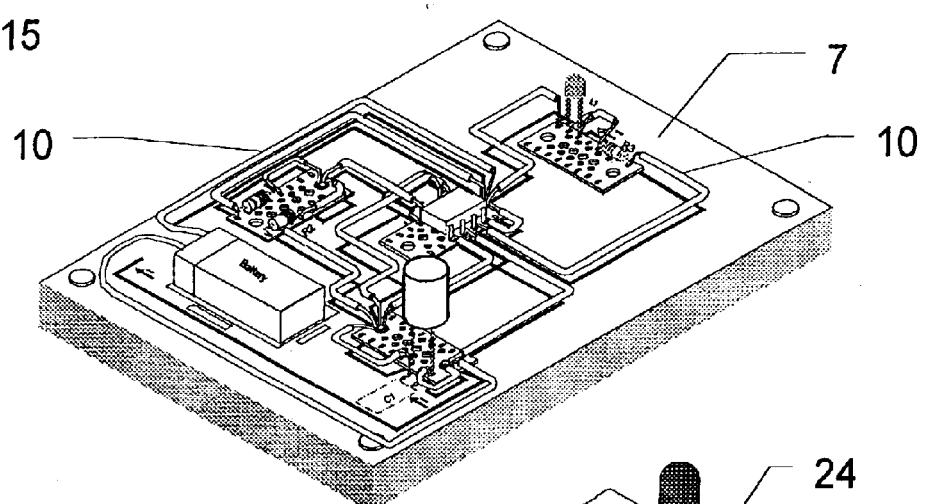
FIG. 15 is the partial circuit of FIG. 14 with hook-up wire added in place; and, FIG. 16 is a close-up depiction of a connector positioned over its corresponding circuit drawing, showing the depiction of a component on the drawing at the location where the component is to be inserted into the connector.

Step Four:
  The solid hook-up wire 10 as indicated by the EASYE™ circuit diagram is then connected between the indicated connection points. The circuit is now completed. FIG. 15 shows the hook-up wires 10 inserted into the EASYE™ connectors 7 to provide electrical continuity between circuit parts in accordance to the needs of the schematic diagram. Power is then connected after completion of a continuity test. If everything has been done correctly, the circuit is then complete and ready to be placed in a circuit containment box, if desired.

Figure 16:
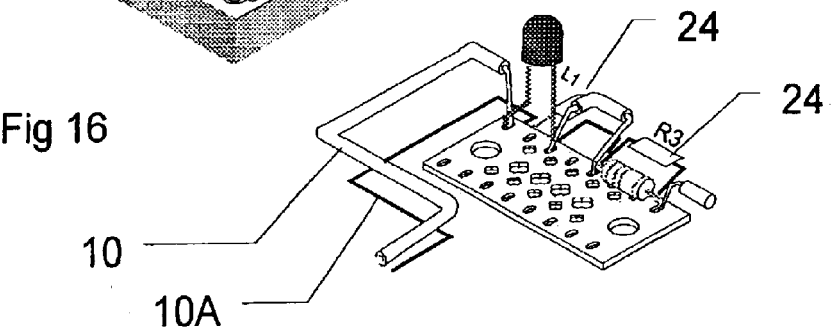

FIG. 16 shows a close-up view of hook-up wire inserted into an EASYE™ connector 1 positioned over a portion of the printed circuit diagram 7. This diagram 7 provides images 24 for both the electrical components that are fitted in place on the connector 1 and the wires 10A that are to engage with the connector 1.

Conclusion

The foregoing has constituted a description of specific embodiments showing how the invention may be preferably applied and put into use. These embodiments are only exemplary. The invention in its broadest, and more specific aspects is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. An electrical circuit construction system comprising a connector for receiving lead ends of lead wires from electronic components and ends of hook-up wire in combination with a wiring block diagram that is provided with images that depict the locations of such connectors for constructing the electrical circuit in accordance with the diagram wherein the connector comprises:
  a) a support plate having a plurality of top-side apertures positioned to receive the lead ends from electronic components and hook-up wire ends, such apertures being dimensioned and constructed to provide both mechanical support for and electrical continuity between said electrical component lead ends and hook-up wire ends; and
  b) protrusions extending underneath the connector positioned for penetrating and stabilizing the connector in place on the wiring block diagram;
wherein the system further includes:
  c) a puncturable supporting base positioned beneath the wiring block diagram to receive the protrusions and stabilize the connector in place once installed over images present on the diagram.

2. The electrical circuit construction system as in claim 1 comprising at least one multi-wire connector aperture dimensioned to serve as a node point for accommodating the hook-up wire ends of a combination of at least two hook-up wires.

3. The electrical circuit construction system as in claim 2 comprising a conductive pin dimensioned to fit within said multi-wire connector aperture to fix the hook-up wire ends in place.

4. The electrical circuit construction system as in claim 2 wherein the connector comprises at least one multi-size-accommodating aperture having a central core portion and multiple, smaller surrounding peripheral slots to receive hook-up wire and component lead wire of differing diameters.

5. The electrical circuit construction system as in claim 4 comprising a conductive pin dimensioned to fit within said multi-size-accommodating aperture to fix the hook-up and lead wire ends in place.

6. The electrical circuit construction system as in claim 1 wherein the top-side apertures penetrate to a lower side of the connector and wherein the connector comprises resilient grasping means located underneath the connector adjacent the apertures for engaging wire ends inserted through such top-side apertures.

7. The electrical circuit construction system as in claim 1 wherein the wiring block diagram depicts circuit components in pictorial form at the locations whereat electronic components are to be positioned for engagement with the connector.

8. The electrical circuit construction system as in claim 7 wherein the connector is positioned on the wiring block diagram for exposing the circuit layout wiring diagram depictions of electronic components and making the circuit layout wiring diagram readily visible.

9. The electrical circuit construction system as in claim 1 having at least two connectors and an integrated circuit chip that is mounted to straddle said at least two connectors.

10. The electrical circuit construction system as in claim 9 having four connectors and an integrated circuit chip that is mounted to straddle said four connectors.

11. A method for constructing an electrical circuit comprising the steps of:
  a) providing a printed circuit diagram depicting sites for connectors, electronic components, and hook up wires;
  b) positioning the printed circuit diagram onto a perforatable base;
  c) providing a connector comprising:
    i) a plurality of top-side apertures positioned to receive lead ends from the electronic components and hook-up wire ends, such top-side apertures being dimensioned and constructed to provide both mechanical support for and electrical continuity between said electronic component lead ends and the hook-up wire ends; and,
    ii) protrusions extending underneath the connector positioned for penetrating and stabilizing the connector in place on the wiring diagram,
  d) inserting said connector into the printed circuit diagram and through into the base;
  e) inserting the electronic components as indicated by the depicting sites on the printed circuit diagram into the connector; and,
  f) inserting the ends of hook-up wires as indicated by the printed circuit diagram to connect the hook-up wires between indicated connection points on the circuit diagram, to provide a completed circuit.

12. A connector for an electrical circuit construction system for receiving lead ends of lead wires from electronic components and the ends of hook-up wire comprising:

a) a support plate having plurality of top-side apertures positioned to receive the lead ends from the electronic components and the hook-up wire ends, such apertures being dimensioned and constructed to provide both mechanical support for and electrical continuity between said electronic component lead ends and hook-up wire ends; and b) protrusions extending underneath the connector and positioned for penetrating and stabilizing the connector in place on a supporting base;

wherein said support plate and protrusions are made of injection molded plastic.

13. The connector as in claim 12 wherein the connector comprises at least one multi-size-accommodating aperture having a central core portion and a plurality of smaller surrounding peripheral slots to receive wires and component leads of differing diameters.

14. The connector as in claim 12 wherein the top-side apertures penetrate to a lower side of the connector support plate and wherein the connector comprises resilient grasping means located underneath the connector support plate adjacent the top-side apertures for engaging wire ends inserted through such top-side apertures.

* * * * *